United States Patent [19]
Tokutomi

[11] 3,752,048
[45] Aug. 14, 1973

[54] ERROR PREVENTING MEANS FOR FLASH SYNCHRONIZED PHOTOGRAPHY

[75] Inventor: Seijiro Tokutomi, Kanagawa-ken, Fujisawa, Japan

[73] Assignee: Asaki Kogaku Kogyo Kabushiki Kaisha, Tokyo-to, Japan

[22] Filed: June 29, 1972

[21] Appl. No.: 267,636

[30] Foreign Application Priority Data
July 20, 1971   Japan ....... 46/63470 (utility model)

[52] U.S. Cl. .............................. 95/11.5 R, 95/10 L
[51] Int. Cl. ........................................... G03b 15/02
[58] Field of Search .................... 95/11.5 R, 11 L

[56] References Cited
UNITED STATES PATENTS
3,504,602   4/1970   Kiper et al. ........................ 95/11.5
3,307,462   3/1967   Hutchison, Jr. et al. ............ 95/11 L Primary Examiner—Robert P. Greiner
Attorney—Robert A. Buckles et al.

[57] ABSTRACT

Error preventing means for focal-plane synchronized camera shutters to inhibit the operation of an electronic flash unit when inadvertently connected to a focal-plane flashbulb outlet, and alternatively for inhibiting the operation of flash bulbs inadvertently connected to an electronic flash outelt, includes a voltage limited short circuiting resistance element which is connected in parallel with a synchronizing switch in the trigger circuit for a flash bulb, and in series with a synchronizing switch of the trigger circuit for an electronic flash unit.

6 Claims, 3 Drawing Figures

ERROR PREVENTING MEANS FOR FLASH SYNCHRONIZED PHOTOGRAPHY

BACKGROUND OF THE INVENTION

In all modern cameras employing focal-plane shutters, which includes all of the very popular single lens reflex type, provision is made for synchronized flash photography with flash bulbs having early ignition and a sufficient period of flash duration to continue throughout the time required for full operation of the focal-plane shutter curtain. This is commonly known as FP synchronization. Most such cameras also provide the photographer with the alternative of using repeatable electronic flash lamps which give much more intense light but of shorter flash duration. The electronic flash also requires different timing in the internal synchronizing circuits of the camera as this type of flash must not be triggered until the focal-plane shutter is all the way open. This is commonly known as X synchronization. Some cameras providing both types of synchronization have separate flash connector terminals, one labeled FP and the other labeled X, while other cameras may have but a single external flash connector socket with a selector switch mounted on the camera body and moveable either to FP or X positions depending on the type of synchronization desired.

Problems may arise, however, if the photographer inadvertently connects his flash equipment to the wrong terminal, or if he inadvertently leaves the "synch selector" in the wrong position, and this can easily occur in the case of a busy photographer who may alternatively use flash bulbs for one type of picture and electronic flash for other shots. The problem in such cases is that the flash equipment itself may operate, albeit not necessarily in proper synchronism with the camera shutter, and the photographer may shoot a whole sequence of pictures without realizing that his shutter and flash are not synchronizing, simply because he sees the flash go off when he presses the shutter release.

OBJECTS OF THE INVENTION

The principal object of the invention is to provide fool-proof means for assuring photographers that their photoflash equipment is properly connected to their cameras.

Alternatively an object of the invention is to provide means for inhibiting and preventing the operation of either flash bulbs or electronic flash units unless the correct synchronizing connections have been made at the camera.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing, in which:

BRIEF DESCRIPTION OF THE DRAWING

Similar reference characters refer to corresponding parts in all three figures of the drawing.

DETAILED DESCRIPTION

Figure 1:
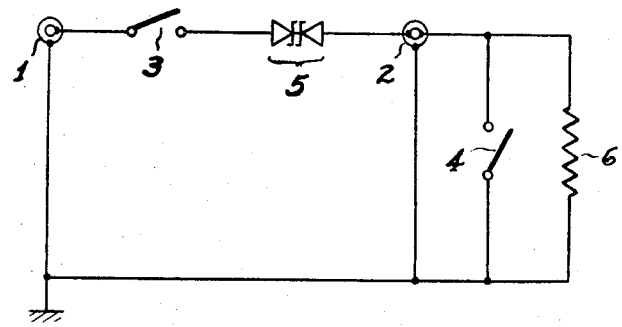
FIG. 1 is a schematic circuit diagram of the simplest form of the invention for use in cameras having separate FP and X synchronizing terminals.

Referring now in greater detail to FIG. 1 of the drawing a flash synchronizing terminal connection 1, which commonly may be a co-axial connector socket mounted on an external portion of a camera body, is provided for the connection of an electronic flash unit and is designated as the X terminal. A similar synchronizing terminal 2 is also provided on the camera body for connection to a flash bulb holder (for FP type flash bulbs) and is designated as the FP terminal. A synchronizing switch 3 internally of the camera and operated by the shutter is connected in series with a voltage regulator element 5 between one side of the X and FP terminals 1 and 2 for the triggering of electronic flash units connected thereto. The voltage regulator element 5 has a predetermined threshold value which may be, for example 25 volts, which is sufficiently low with respect to the voltage of the external electronic flash unit (not shown) that it is fully conductive when the synchronizing switch 3 is closed. Thus, this synchronizing circuit of FIG. 1 causes the electronic flash to operate when such flash equipment is connected to terminal 1.

Still referring to FIG. 1, synchronizing switch 4 is connected across the conductors of FP terminal 2 and in parallel with a resistor 6 which may be of the value of approximately 100 KΩ. The outer conductors of the X and FP synchronizing terminals 1 and 2 are grounded to the camera body as indicated in FIG. 1. Operation of the synchronizing switches 3 and 4 is controlled by connection with the camera shutter mechanism (not shown) in such manner that switch 4 is first closed and subsequently thereto (in a matter of microseconds as determined by the shutter speed) switch 3 is closed. When the synchro-cord of an electronic flash unit is connected as it should be to the X synch terminal 1, closure first of switch 4 and thereafter of switch 3 completes a circuit through voltage regulator 5 to fire the electronic flash at the moment switch 3 closes, when the camera focal-plane shutter is fully open. However, if the photographer has inadvertently and erroneously connected his electronic flash cord to the FP terminal 2, then the power source of the electronic flash unit is dissipated through resistor 6 and the electronic flash does not go off, so that the photographer immediately realizes that something is awry and thereby discovers his erroneous connection of the synch cord.

Alternatively, still referring to FIG. 1 of the drawing, if the photographer is using flash bulbs as distinguished from electronic flash and he inadvertently or erroneously connects his synch cord to the X terminal 1 instead of to the FP terminal 2 as should be done in this case, then the power supply of the external flash gun (not shown) which is of lower voltage than the operating threshold of voltage regulator 5 is unable to complete a firing circuit therethrough and consequently the flash bulb does not operate even though switches 3 and 4 are both closed by the camera shutter action. Upon noting the failure of the bulb to flash the photographer discovers his erroneous connection and may then correctly connect the synch cord to the FP terminal 2. With the proper connection of flash gun to FP terminal 2, resistor 6 is of such a high impedance that it imposes no drain upon the flash bulb power souce, and consequently the flash bulb fires immediately upon closure of switch 4 at the start of the camera shutter's opening action.

Figure 2:
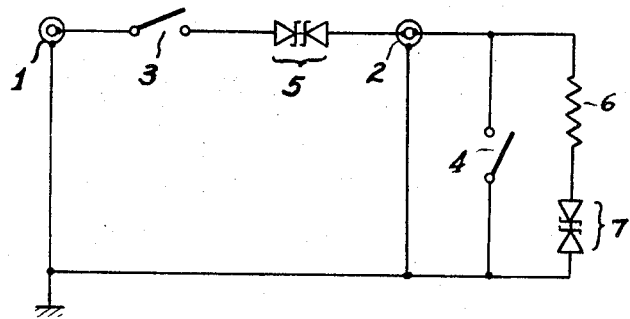
FIG. 2 is a schematic circuit diagram similar to FIG. 1 but illustrating an improved embodiment of the invention.

Reference is now had to FIG. 2 of the drawing which discloses an improvement over the circuit of FIG. 1, requiring only the addition of a second voltage regulator element 7. A possible drawback or inconvenience with the circuit of FIG. 1 is that when the synchro-cord of an electronic flash unit is erraneously connected to the FP terminal 2, the current drain through resistor 6 (which prevents the electronic flash from operating in this case) may at least temporarily exhaust the power supply of the electronic flash unit, thereby causing an undesirable delay in recharging time before the electronic flash may be operated when properly connected thereafter to X terminal 1. By inserting voltage regulator element 7 in series with resistor 6, element 7 being of corresponding characteristics to element 5, the voltage drop across 6 and 7 is sufficient to inhibit and prevent the electronic flash unit from firing, while the current drain upon the electronic flash unit's power supply is very substantially diminished. Otherwise the operation of the embodiment of FIG. 2 is the same as described above with reference to FIG. 1.

Figure 3:
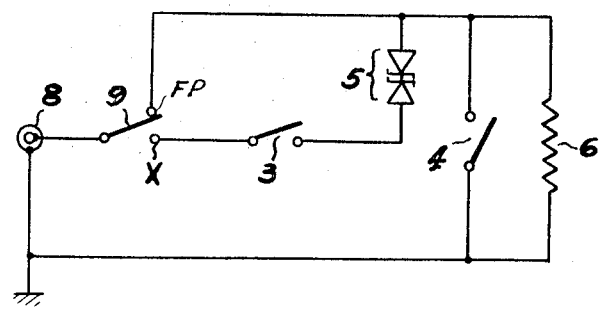
FIG. 3 is a schematic circuit diagram of an alternative embodiment of the invention illustrated in FIG. 1 and FIG. 2, and especially useful in cameras provided with but a single flash synchronizing terminal for either FP or X synchronization.

Reference is now made to FIG. 3 of the drawing which may be considered a preferred embodiment of the invention, at least to the extent that it provides but a single flash connector terminal 8 into which may be connected either electronic flash units or flash bulb equipment. A two position selector switch 9 mounted on the camera body is manually operable by the photographer into either FP of X synch positions as shown in FIG. 3. The internal shutter operated synchronizing switches 3 and 4 correspond to the same elements in FIG. 1 and FIG. 2, and are operated in the same sequence described above. Similarly voltage regulator 5 and resistor 6 correspond to and operate the same as the corresponding elements described in FIG. 1 and FIG. 2. Errors made by the photographer in the positioning of switch 9 cause the same circuit states as those caused by the reverse synchrocord connections aforementioned with reference to FIG. 1 and FIG. 2, so that the user becomes immediately aware of his error and can take prompt corrective action to avoid ruining a sequence of photographs.

As the constituent elements required for the use of this invention are very few, very small in physical size, quite inexpensive, and the circuit interconections are simple, the invention can be easily incorporated into cameras for substantially greater convenience and reliability of photography by flash. Furthermore, it is easily possible to add visual display means in the form of a miniature lamp operable by current produced in the circuit due to reverse synchro-cord connection or erroneous positioning of the change-over switch. Additionally, if desired, a safety switch may be provided to keep the synchronizing circuit for the electronic flash tube normally open at all times except during the interval of shutter release.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. Photographic flash inhibiting means for preventing the firing of either flash bulbs or electronic flash tubes when either form of flash equipment is erroneously connected to the wrong synchronizing circuit of a camera, comprising in combination a first camera connector for connection to flash bulbs and a second camera connector for connection to electronic flash tubes, a first synchronizing switch for operating flash bulbs connected to said first camera connector and a second synchronizing switch for operating electronic flash tubes connected to said second camera connector, said first and second switches controlled by the camera shutter to close successively in sequential order as the shutter opens, voltage dropping conductive means connected across said first camera connector and in parallel with said first synchronizing switch whereby an electronic flash if connected to said first connector is effectively short circuited by said voltage dropping means, and voltage limited regulating means connected in series with said second synchronizing switch between said first and second camera connectors whereby a flash bulb if connected to said second connector is prevented from operating by said voltage limited regulator means dropping the voltage below the required threshold value.

2. The combination of claim 1 wherein said voltage dropping conductive means comprises a fixed resistance, and said voltage limited regulating means comprises a zener diode.

3. The combination of claim 1 wherein said voltage dropping conductive means comprises a fixed resistance in series with a zener diode.

4. Error preventing means for flash synchronized photography wherein a selector switch movable to first and second positions is provided for conditioning a flash connector to operate with flashbulbs in the first position and with electronic flash in the second position, a first synchronizing contact switch is connected to said selector switch in its first position for triggering a flashbulb circuit connected thereto and a second synchronizing contact switch is connected to said selector switch in its second position for triggering an electronic flash circuit connected thereto, comprising in combination a voltage dropping current conductive element connected in parallel with said first synchronizing contact switch whereby an electronic flash is prevented from operating when said selector switch is in its first position, and a threshold voltage limited conductive element is connected in series with said second synchronizing contact switch whereby a flashbulb is prevented from operating when said selector switch is in its second position.

5. The combination of claim 4 wherein said voltage dropping current conductive element comprises a fixed resistor in series with at least one zener diode.

6. The combination of claim 4 wherein said threshold voltage limited conductive element comprises a pair of zener diodes connected back to back.

* * * * *